United States Patent
Höfig et al.

(10) Patent No.: US 12,184,748 B2
(45) Date of Patent: Dec. 31, 2024

(54) DATA TRANSMISSION WITH COMMUNICATION BROKER

(71) Applicant: Siemens Aktiengesellschaft, Munich (DE)

(72) Inventors: Kai Höfig, Rohrdorf (DE); Chee-Hung Koo, Stuttgart (DE); Stefan Rothbauer, Augsburg (DE); Sebastian Schröck, Weil der Stadt (DE); Marian Marcel Vorderer, Rutesheim (DE); Marc Zeller, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 6 days.

(21) Appl. No.: 17/799,490

(22) PCT Filed: Feb. 18, 2021

(86) PCT No.: PCT/EP2021/054054
§ 371 (c)(1),
(2) Date: Aug. 12, 2022

(87) PCT Pub. No.: WO2021/165415
PCT Pub. Date: Aug. 26, 2021

(65) Prior Publication Data
US 2023/0076990 A1    Mar. 9, 2023

(30) Foreign Application Priority Data

Feb. 19, 2020   (EP) ..................... 20158292

(51) Int. Cl.
*H04L 69/06*   (2022.01)
*H04L 9/40*    (2022.01)
*H04L 69/00*   (2022.01)

(52) U.S. Cl.
CPC .......... *H04L 69/06* (2013.01); *H04L 63/0428* (2013.01); *H04L 69/26* (2013.01)

(58) Field of Classification Search
CPC ..... H04L 69/06; H04L 63/0428; H04L 69/26; H04L 67/12
See application file for complete search history.

(56) References Cited

U.S. PATENT DOCUMENTS

| | | | |
|---|---|---|---|
| 6,359,986 B1 * | 3/2002 | Tatebayashi | H04L 9/14 380/277 |
| 2009/0150294 A1 * | 6/2009 | March | G06Q 20/10 342/357.22 |

(Continued)

FOREIGN PATENT DOCUMENTS

CN    108322497 A    7/2018

OTHER PUBLICATIONS

Anonymous: "GitHub—forgedsoftware/measurementcommon: A json file detailing a full set of systems and their associated units.", Dec. 27, 2014 (Dec. 27, 2014), XP055717867, retrieved on the Internet on Jul. 24, 2020: URL: https://github.com/forgedsoftware/measurementcommon.

(Continued)

*Primary Examiner* — Fadi Haj Said
(74) *Attorney, Agent, or Firm* — Schmeiser, Olsen & Watts, LLP

(57) ABSTRACT

A method for transmitting data from a first sub-system to a second sub-system includes the steps of providing a dataset by the first sub-system, the dataset having a data structure identifier and a data value; sending the dataset to the second sub-system; receiving the dataset by the second sub-system; checking whether complete assignment information regarding the data structure assigned to the data structure identifier is present in the second sub-system; recovering any missing assignment information from a communication broker in the (Continued)

event that the second sub-system does not contain complete assignment information; and determining the data structure on the basis of the data structure identifier and the assignment information. A corresponding system, a corresponding first sub-system, a corresponding second sub-system and a communication broker are also proposed.

13 Claims, 1 Drawing Sheet

(56) References Cited

U.S. PATENT DOCUMENTS

| | | | | |
|---|---|---|---|---|
| 2015/0088740 | A1* | 3/2015 | Doyle | G06Q 40/00 |
| | | | | 705/42 |
| 2015/0378705 | A1* | 12/2015 | Tomlinson | H04L 63/0442 |
| | | | | 717/177 |
| 2020/0090003 | A1* | 3/2020 | Marques | G06Q 20/4016 |
| 2021/0019426 | A1* | 1/2021 | Owens | G06F 21/602 |

OTHER PUBLICATIONS

PCT International Search Report and Written Opinion of International Searching Authority mailed May 14, 2021 corresponding to PCT International Application No. PCT/EP2021/054054 filed Feb. 18, 2021.

* cited by examiner

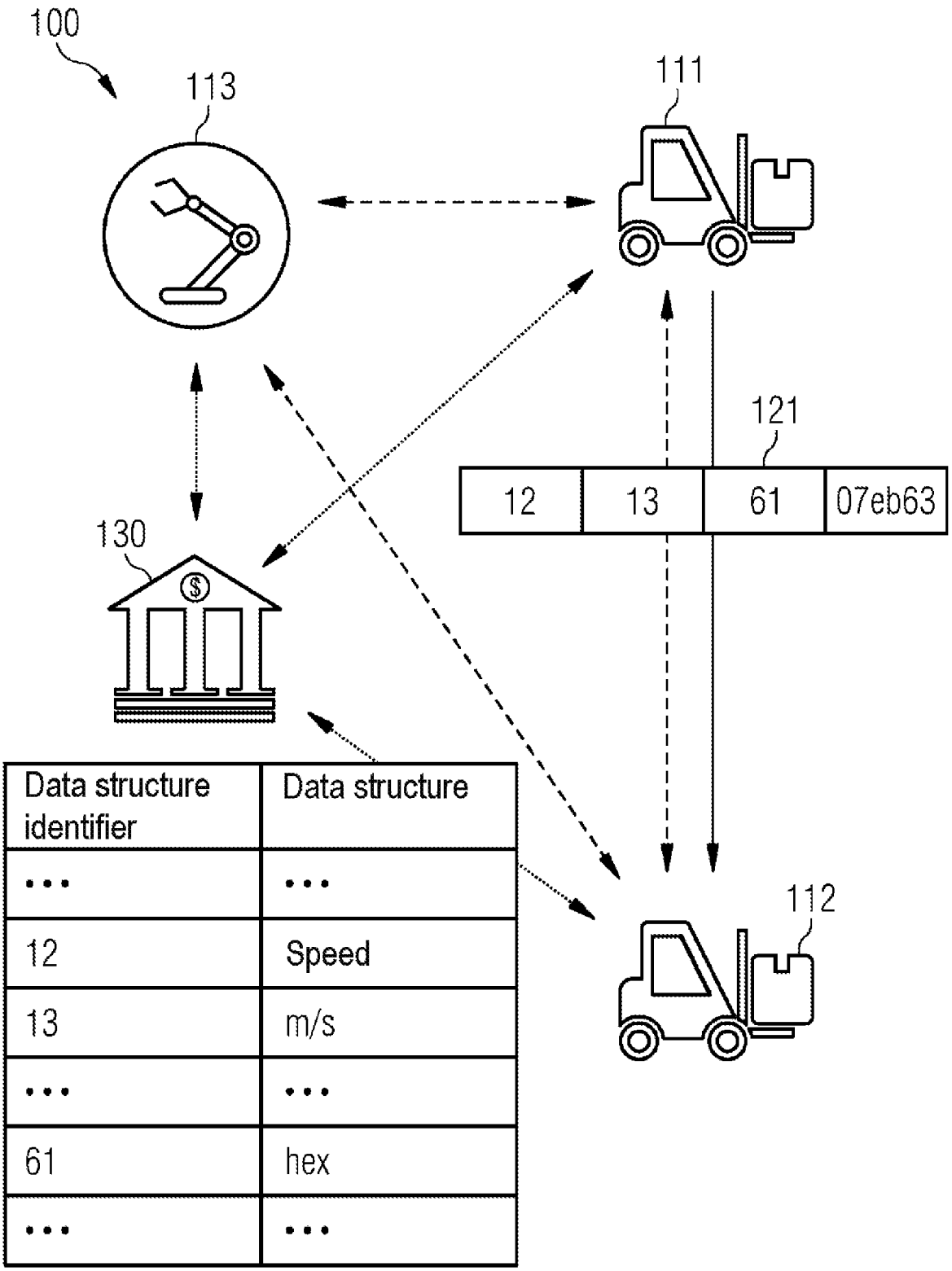

DATA TRANSMISSION WITH COMMUNICATION BROKER

CROSS-REFERENCE TO RELATED APPLICATIONS

This application claims priority to PCT Application No. PCT/EP2021/054054, having a filing date of Feb. 18, 2021, which claims priority to EP Application No. 20158292.1, having a filing date of Feb. 19, 2020, the entire contents both of which are hereby incorporated by reference.

FIELD OF TECHNOLOGY

The following relates to a method for data transmission from a first subsystem to a second subsystem, to a system configured to carry out the method, and to the components of said system.

BACKGROUND

For the successful data transmission from a first subsystem to a second subsystem, it is necessary for the second subsystem to be able also to interpret the transmitted data. In particular, it is necessary that the second subsystem has knowledge of the data structure, or obtains knowledge of the data structure. Without knowledge of the data structure, it is not possible for the second subsystem to interpret the data for further processing.

For example, a character string '07eb63' transmitted from the first subsystem (e.g. a first forklift truck) to the second subsystem (e.g. a second forklift truck) can be processed by the second subsystem only if the second subsystem has information that this data structure concerns a speed which is given in the units $ms^{-1}$ and whose value is coded in the hexadecimal system.

Usually, the data structure, i.e. in particular the information about the variable whose value is transmitted, the type of coding of the value of the variable, and the units in which the value of the variable is given, is standardized in advance and is known to the first subsystem and the second subsystem.

The increasing digitization of industrial production has not only resulted in a significant increase in the subsystems between which data must be exchanged, but the subsystems may also be assigned to different companies. This makes it complex to develop new systems having varying data structures.

SUMMARY

Aspects relate to a method for data transmission from a first subsystem to a second subsystem, and a system configured to carry out the method and also the components of said system, by means of which the above-mentioned requirements can be better met.

A method is proposed for data transmission from a first subsystem to a second subsystem. The method comprises providing a dataset by the first subsystem, which dataset has a data structure identifier and a data value, sending the dataset to the second subsystem, receiving the dataset by the second subsystem, checking whether full assignment information about the data structure assigned to the data structure identifier is present in the second subsystem, retrieving the missing assignment information from a communication broker if the full assignment information is not present in the second subsystem, and determining the data structure on the basis of the data structure identifier and the assignment information.

It is conceivable that the first subsystem provides a dataset that comprises a plurality of data structure identifiers and associated data values. For example, the first subsystem may be a forklift truck, and a dataset may be made available that provides information about the speed of the forklift truck and about the number of transported pallets.

In an exemplary embodiment, the data structure identifier comprises a variable identifier, and the data structure comprises a variable assigned to the variable identifier, wherein the data value comprises a value of the variable.

Staying with the example of the aforementioned forklift truck example, the variable may relate to transported pallets, in which case the value, the data value, defines the value of this variable, namely the number of transported pallets.

In addition, an embodiment provides that the data structure identifier comprises a units identifier, and that the data structure comprises units assigned to the units identifier.

In the aforementioned example, the variable may be, for instance, the speed, the units may be meters per second (m/s), and the data value may be the speed value given as a hexadecimal value.

According to a further embodiment, the data value is encrypted before the dataset is sent to the second subsystem, and the data value is decrypted by the second subsystem.

This can prevent, or at least make more difficult, misuse of the data values by an unauthorized subsystem.

To make it more difficult to misuse the data values, it is also conceivable for the communication broker to provide only an authorized subsystem with the assignment information, without which it is not possible to assign the data values.

According to an additional exemplary embodiment, the first subsystem transmits decryption information to the communication broker.

In addition, an exemplary embodiment provides that the second subsystem retrieves decryption information from the communication broker before the decryption of the data value.

The distribution of the decryption information can thereby take place over a second secure path in order to reduce the risk of a successful attack on the keys.

According to a further embodiment, the data value is encrypted on the basis of encryption information assigned to the second subsystem.

For example, a private/public key method can be used for the encryption.

According to an additional exemplary embodiment, the encryption information assigned to the second subsystem is retrieved from the communication broker before the encryption.

In addition, an embodiment provides that the decryption information and/or the encryption information has a limited validity, in particular a time-limited validity.

The time-limited validity of the decryption information and/or encryption information can further increase the communication security.

According to a further embodiment, the dataset is transferred in real time.

According to an additional exemplary embodiment, the first subsystem transmits to the communication broker assignment information about the data structure belonging to the data structure identifier.

This allows the first subsystem to define new data structures that can be used by other subsystems.

In addition, an embodiment provides that the communication broker is implemented as a distributed database, in particular as a blockchain.

In addition, a first subsystem is proposed that in particular can be for carrying out an above-described method. The first subsystem is configured to provide a dataset comprising a data structure identifier and a data value. The first subsystem is also configured to send the dataset to at least one second subsystem.

In particular, the first subsystem can send the dataset simultaneously or sequentially to a third subsystem.

Furthermore, a second subsystem is proposed that can be configured in particular to carry out an above-described method. The second subsystem is configured to receive a dataset comprising a data structure identifier and a data value, to check whether full assignment information about the data structure assigned to the data structure identifier is present in the second subsystem, to retrieve the missing assignment information from a communication broker if the full assignment information is not present in the second subsystem, and to determine the data structure on the basis of the data structure identifier and the assignment information.

In addition, a communication broker is proposed that can be configured in particular to carry out an above-described method. The communication broker is configured to provide assignment information about the data structure assigned to a data structure identifier.

Finally, a system is proposed having an above-described first subsystem, having a second above-described subsystem, and having an above-described communication broker.

The system may have more than one single first subsystem and one single second subsystem. For example, the system may comprise one first subsystem that sends the dataset to two second subsystems. Equally, the system may comprise one second subsystem that receives datasets from two first subsystems. In principle, it is conceivable that each subsystem is embodied both as a first subsystem and as a second subsystem.

The communication broker may be physically distributed over a plurality of systems.

BRIEF DESCRIPTION

Some of the embodiments will be described in detail, with reference to the following figures, wherein like designations denote like members, wherein:

FIG. 1 shows a system having a plurality of subsystems.

DETAILED DESCRIPTION

The system 100 shown in FIG. 1 comprises a plurality of subsystems 111, 112 and 113, between which data is meant to be transmitted, as indicated by dashed lines between the subsystems 111, 112 and 113. It is conceivable that some subsystems only receive data, and other subsystems only send data. Typically, however, a subsystem 111, 112 and 113 of the system 100 will both receive data and send data.

The subsystems 111, 112 and 113 may be assigned to different companies. In the production environment, it may be necessary that the data has to be transferred between the subsystems in real time. Often only a limited bandwidth is available for the data transmission.

Therefore it can be advantageous to transfer only the payload data. This assumes that the structure of the payload data is known to the particular subsystem that is receiving data.

The above-described method is proposed for this purpose, and shall be explained using the example of the subsystems 111 and 112, where the subsystem 111 serves as an example of a first subsystem, and the subsystem 112 as an example of a second subsystem.

The method is used for data transmission from the first subsystem 111 to the second subsystem 112. In this process, the first subsystem 111 provides and sends to the second subsystem 112 a dataset 121. The dataset 121 comprises a plurality of data structure identifiers and a data value. In the exemplary embodiment shown, the data structure identifiers are denoted by 12, 13 and 61, and the data value is '07eb63'.

The receiving second subsystem 112 checks whether full assignment information about the data structure identifiers is present. If this is not the case, the missing assignment information is retrieved from a communication broker 130.

The retrieval from, and the optional transmission (explained later) of assignment information to, the communication broker 130 is represented by dotted lines in FIG. 1

In principle, a company to which one of the subsystems 111, 112 or 113 is assigned can provide the communication broker 130. Usually, however, the communication broker 130 is provided by a neutral instance.

In the example shown, the communication broker 130 provides the assignment information for the data structure identifiers 12, 31 and 61. This assignment information allows the second subsystem 112 to interpret the data provided by the first subsystem 111. The data structure identifier 12 indicates that the data value '07eb63' is a speed. The data structure identifier 12 can hence be regarded as a variable identifier. The data structure identifier 13 indicates that the data value '07eb63' is given in the units meters per second (m/s). The data structure identifier 13 can hence be regarded as a units identifier. Finally, the data structure identifier indicates how the data value '07eb63' is coded, namely as a hexadecimal value.

The assignment information hence makes it possible for the second subsystem 112 to interpret the data transmitted by the first subsystem 111.

It may become necessary or desirable during further development of the individual subsystems 111, 112, 133 to define new data structures. In order to give each of the other subsystems the opportunity to be able to interpret data values transmitted on the basis of the new data structure, assignment information about the data structure assigned to a new data structure identifier is transmitted to the communication broker. It is then possible for the other subsystems to obtain the new assignment information via the communication broker. This allows a subsystem to define new data structures that can be used by other subsystems.

Uniqueness of the assignment information between data structure identifier and data structure can be achieved by allocating each data structure identifier in the system only once.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for data transmission from a first subsystem of an industrial production system to a second subsystem of the industrial production system, comprising:

providing a dataset by the first subsystem of the industrial production system, wherein the dataset provided by the first subsystem of the industrial production system relates to a property of the first subsystem of the industrial production system, wherein the dataset comprises a data structure identifier, wherein the data structure identifier comprises a variable identifier that identifies the property of the first subsystem of the industrial production system, and a data value, wherein the data value comprises a value of the property of the first subsystem of the industrial production system;

sending the dataset to the second subsystem of the industrial production system;

receiving the dataset by the second subsystem of the industrial production system;

checking whether assignment information about a data structure assigned to the data structure identifier and not included in the dataset is present in the second subsystem of the industrial production system;

retrieving the assignment information from a communication broker if the assignment information is not present in the second subsystem of the industrial production system, wherein the communication broker is implemented as a blockchain;

determining the data structure on the basis of the data structure identifier and the assignment information.

2. The method as claimed in claim 1,
wherein the data structure comprises a variable assigned to the variable identifier,
the data value comprises a value of the variable.

3. The method as claimed in claim 2,
wherein the data structure identifier further comprises a units identifier, and the data structure comprises units assigned to the units identifier.

4. The method as claimed in claim 1,
wherein the data value is encrypted before the dataset is sent to the second subsystem of the industrial production system,
the data value is decrypted by the second subsystem of the industrial production system.

5. The method as claimed in claim 4,
wherein the first subsystem of the industrial production system transmits decryption information to the communication broker.

6. The method as claimed in claim 4,
wherein the second subsystem of the industrial production system retrieves decryption information from the communication broker before the decryption of the data value.

7. The method as claimed in claim 4,
wherein the data value is encrypted on the basis of encryption information assigned to the second subsystem of the industrial production system.

8. The method as claimed in claim 7,
wherein the encryption information assigned to the second subsystem of the industrial production system is retrieved from the communication broker before the encryption of the data value.

9. The method as claimed in claim 4,
wherein decryption information and/or encryption information has a limited validity.

10. The method as claimed in claim 1,
wherein the dataset is transferred in real time.

11. The method as claimed in claim 1,
wherein the first subsystem of the industrial production system transmits to the communication broker the assignment information about the data structure belonging to the data structure identifier.

12. The method as claimed in claim 1,
wherein the assignment information allows the second subsystem to interpret the dataset provided by the first subsystem of the industrial production system.

13. The method as claimed in claim 1,
wherein the assignment information allows the second subsystem of the industrial production system to interpret the data structure identifier.

\* \* \* \* \*